Figure 1:
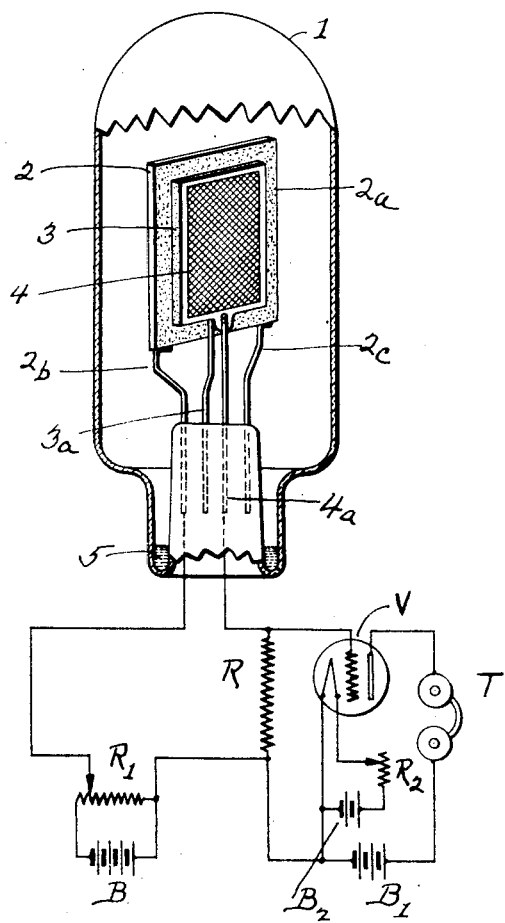

May 26, 1931.   S. RUBEN   1,807,326
PHOTO ELECTRIC CELL
Filed Aug. 24, 1928   2 Sheets-Sheet 1

Inventor
SAMUEL RUBEN
By his Attorney

May 26, 1931.  S. RUBEN  1,807,326
PHOTO ELECTRIC CELL
Filed Aug. 24, 1928   2 Sheets-Sheet 2

Inventor
SAMUEL RUBEN
By his Attorney M. C. Clephane

Patented May 26, 1931

1,807,326

UNITED STATES PATENT OFFICE

SAMUEL RUBEN, OF NEW YORK, N. Y., ASSIGNOR, BY MESNE ASSIGNMENTS, TO RUBEN TUBE COMPANY, OF NEW YORK, N. Y., A CORPORATION OF DELAWARE

PHOTO-ELECTRIC CELL

Application filed August 24, 1928. Serial No. 301,926.

This invention relates to a photo-electrolytic cell and more particularly it relates to a cell utilizing the resistance variations of a light-responsive electronically conductive crystal electrode surface in surface contact with a translucent electrolytically conductive crystal plate, to effect variations in current flowing between the electrodes.

By the terms of this invention there is employed a light-sensitive electrode, preferably having a surface layer of a compound of the electrode material, and particularly cuprous oxide on a copper base, held in close surface contact with a translucent and electrolytically conductive large unit crystal, the cooperating electrode comprising a reticular metal sheet, likewise contacting on the opposite side of the crystal.

While cuprous oxide is preferred for the light-responsive, electronically conductive crystal electrode surface, other electrode materials, such as selenium of molybdenum sulphids, give satisfactory performance. But this invention will be described particularly with reference to a cell employing a copper electrode with a thermally integrally formed non-porous, homogeneous layer of cuprous oxide over its entire surface.

The crystal preferred is that produced from a super-saturated solution of sodium chloride which, due to its hydroscopic character, maintains its conductivity. However, other large crystals which are translucent and electrolytically conductive are also well adapted for use in this device. For some purposes it is of advantage to mix a small amount of glycerine with the crystal mixture prior to the undercooling period, to increase the hydroscopic action. For selective absorption and increased contact potentials crystals, such as those from cobalt chloride or cobalt bromide, are well adapted. For most efficient cell operation the electrolytically conductive crystal is surface-ground to a thin slab to afford a high degree of light penetration and the best surface contact with the electrodes on opposite sides, one of the electrodes being preferably nickel. The gauze or reticular sheet only slightly diminishes the energy of light rays impacting on that side for transmission through the crystal to the cuprous oxide layer.

With some salt crystals, such as those obtained from a supersaturated and slowly cooled solution of sodium-potassium-tartrate, (Rochelle salts) piezo-electric effects are obtainable. Mechanical pressure changes occurring in these crystals with variations in potential with exposure of the electrode to light rays, can be employed to operate a contact device, direct or microphonic, for the control of an external circuit.

Figure 2:
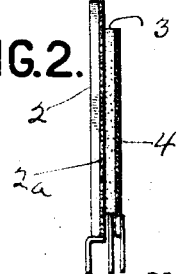
Figure 3:
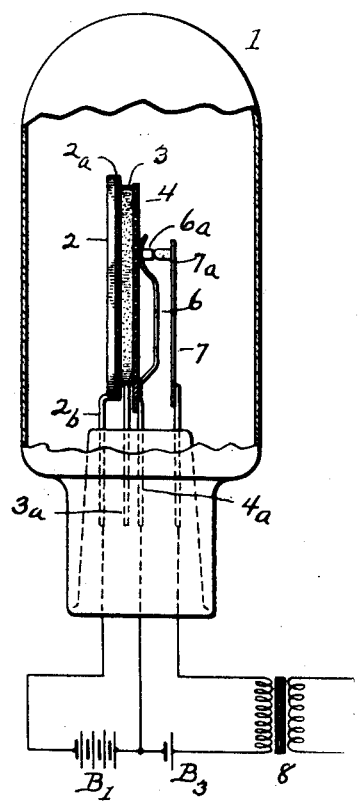

For a better understanding of the invention reference is made to the accompanying drawings illustrating embodiments thereof, in which Fig. 1 illustrates a cell connected in an electric circuit and cut away to show the elements thereof, Fig. 2 showing the electrode arrangement, and Fig. 3 giving another view of the cell with carbon contacts within the cell for controlling an external circuit, utilizing the piezo effect of the crystal employed.

Referring more particularly to Fig. 1, 1 represents a glass envelope containing copper electrode 2, surfaced with a thermally integrally formed non-porous, homogeneous cuprous oxide $2_a$, as described, a sodium chloride crystal 3, in close surface contact with the cuprous oxide surface, supported by member $3_a$, and a nickel gauze sheet 4, supported by $4_a$ and in surface contact with the sodium chloride crystal. The copper electrode 2, is supported by members $2_b$ and $2_c$. Within the lower area of envelop 1 is a small amount of liquid 5, for maintaining the water of crystallization.

The electrode terminals of the cell are connected with an external source of potential $R_1$, the potentiometer being energized by the potential source B. The cell is also connected in series with fixed resistance R, which is connected with the terminals of vacuum tube V, which provides for the amplification of any potential changes across R through the control of the electron stream in tube V as affecting the translating device T. $B_2$ is a battery for heating the filament of tube V as controlled by the resistance $R_2$. $B_1$ is the accelerating potential for the electron discharge in the tube.

In Fig. 2 the elements 2, 2ₐ, 3 and 4, represent those elements in Fig. 1 having corresponding numerals.

In operation, as light is impressed upon crystal 3, through gauze electrode 4, it is transmitted to the cuprous oxide layer of electrode 2, reducing the resistance of electrode 2 and changing the potential at the cell terminals, to be amplified by tube V for translating by telephone receiver T.

Referring more particularly to Fig. 3, the envelop and the two electrodes and their terminals are the same as the elements bearing corresponding numerals in Fig. 1 except that electrode 4 is a perforated nickel sheet, and plate 3 is a sodium-potassium-tartrate crystal. Mounted on conductor support $4_a$ is a spring 6, carrying carbon contact $6_a$, held in surface contact with the cathode plate 4. Mounted on rigid conductor support 7 is the fixed carbon contact $7_a$, the two contacts being used to control a local circuit energized by battery $B_3$, and in the circuit of which is transformer 8. At $B_1$ is a source of potential for the cathode-anode circuit.

In the operation of this device, which employs the piezo effect of the crystal used, a constant potential is applied to the faces of this element, the potential being controlled by the resistance of the cuprous oxide layer of electrode 2. As the crystal is subjected to variations of potential of the electrodes, the internal pressure of the crystal changes due to exposure of the electrodes to light rays, the mechanical effect of which is transmitted to the contacts $6_a$ and $7_a$, causing changes of current flowing in the local circuit. This device is preferred for microphonic contacts; but for such uses as the reception of audio frequency modulated light, a make-and-break type of contact can be advantageously employed.

What I claim is:

1. A photo-electrolytic cell having an electrode plate with a surface of a light-responsive electronically conductive lower resistance crystal material, a cooperating reticular electrode plate and a translucent, electrolytically conductive crystal plate interposed between and in surface contact with the electrodes.

2. A photo-electrolytic cell having a copper electrode plate with a surface layer of cuprous oxide, a cooperating reticular electrode plate and a translucent, electrolytically conductive crystal plate interposed between and in surface contact with the electrodes.

3. A photo-electrolytic cell having an electrode plate with a surface of a light-responsive electronically conductive crystal material, a cooperating reticular electrode plate containing nickel and a translucent, electrolytically conductive crystal plate interposed between and in surface contact with the electrodes.

4. A photo-electrolytic cell having a copper electrode plate with a surface layer of cuprous oxide, a cooperating reticular electrode plate containing nickel and a translucent, electrolytically conductive crystal plate interposed between and in surface contact with the electrodes.

5. A photo-electrolytic cell comprising a closed container, a pair of electrodes, and a dissolvable crystal between and in surface contact with both of said electrodes, said container having a pocket for reception of water of crystallization from said crystal and spaced from said crystal whereby the crystal and water of crystallization are kept separate.

In testimony whereof, Samuel Ruben has signed his name to this specification this 22nd day of August 1928.

SAMUEL RUBEN.